July 5, 1949.  R. H. DEITRICKSON  2,475,224
ROTARY HYDRAULIC MOTOR
Filed Oct. 14, 1944  6 Sheets-Sheet 1
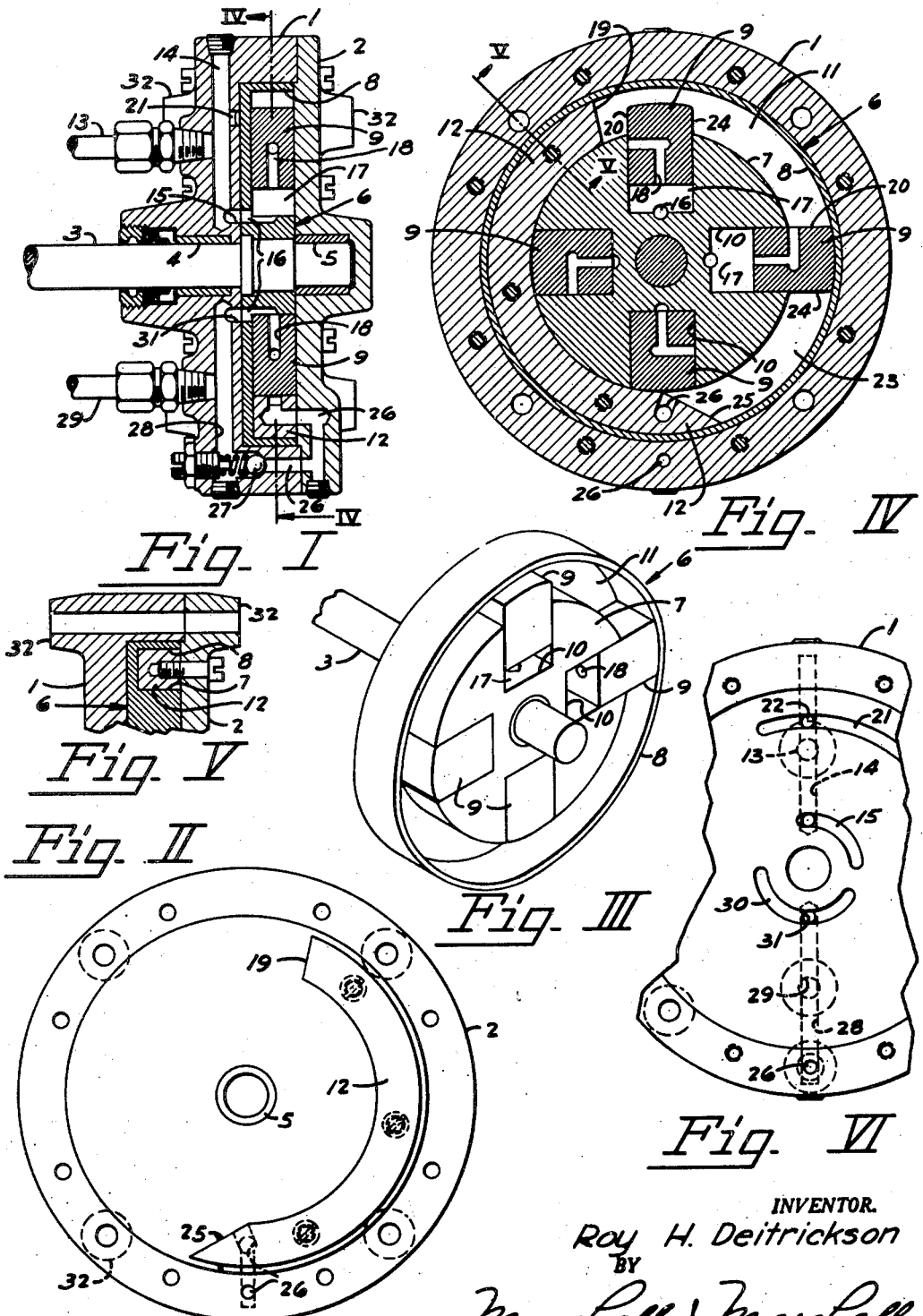
INVENTOR.
Roy H. Deitrickson
BY
Marshall & Marshall
ATTORNEYS

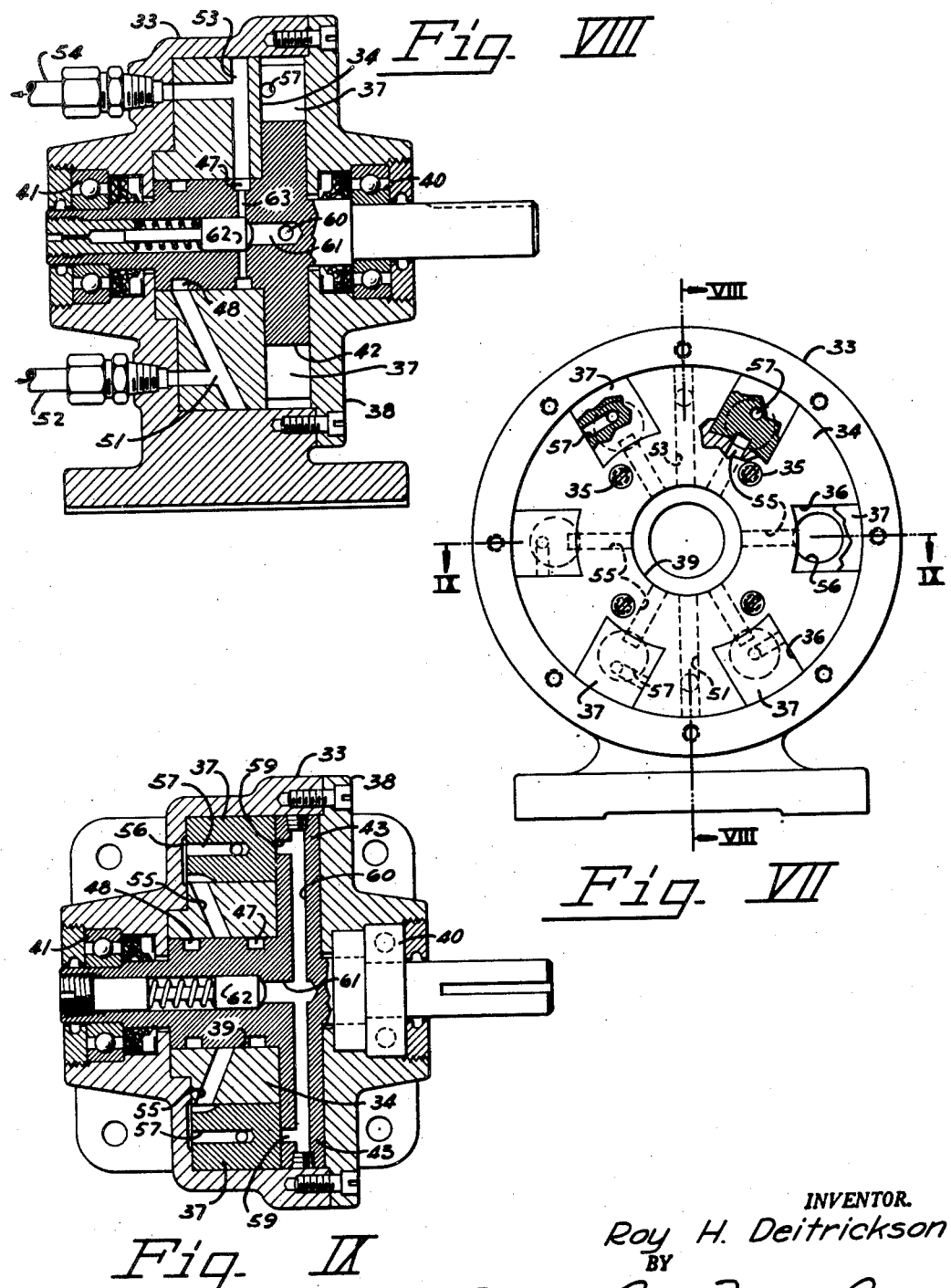

July 5, 1949.  R. H. DEITRICKSON  2,475,224
ROTARY HYDRAULIC MOTOR
Filed Oct. 14, 1944  6 Sheets-Sheet 3
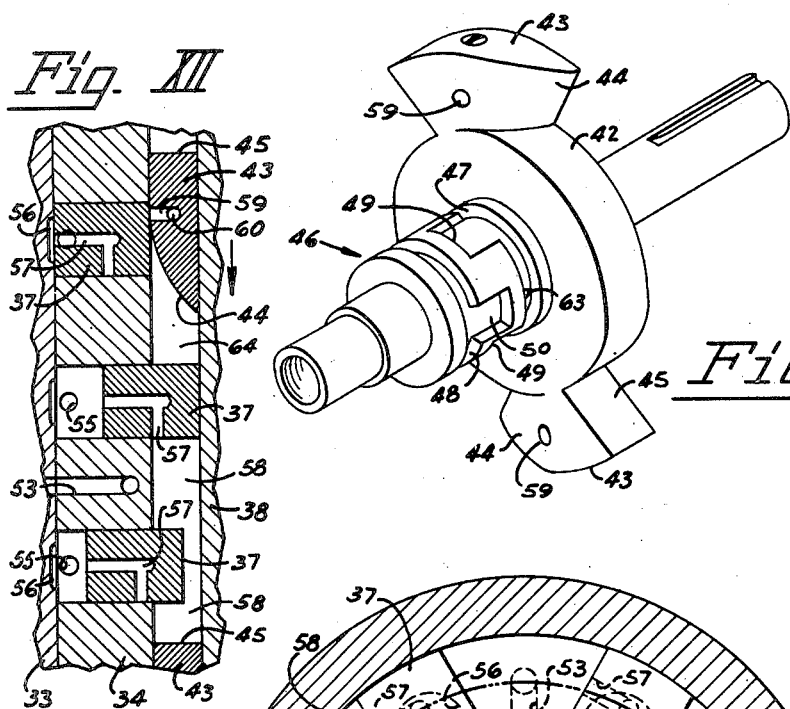
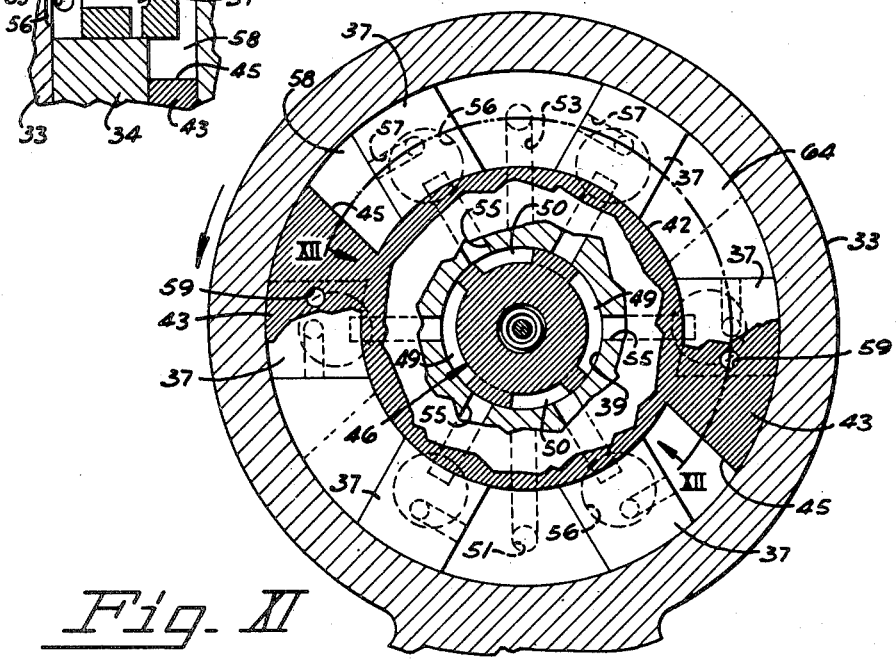
INVENTOR.
Roy H. Deitrickson
BY
Marshall & Marshall
ATTORNEYS July 5, 1949.  R. H. DEITRICKSON  2,475,224
ROTARY HYDRAULIC MOTOR
Filed Oct. 14, 1944  6 Sheets-Sheet 4
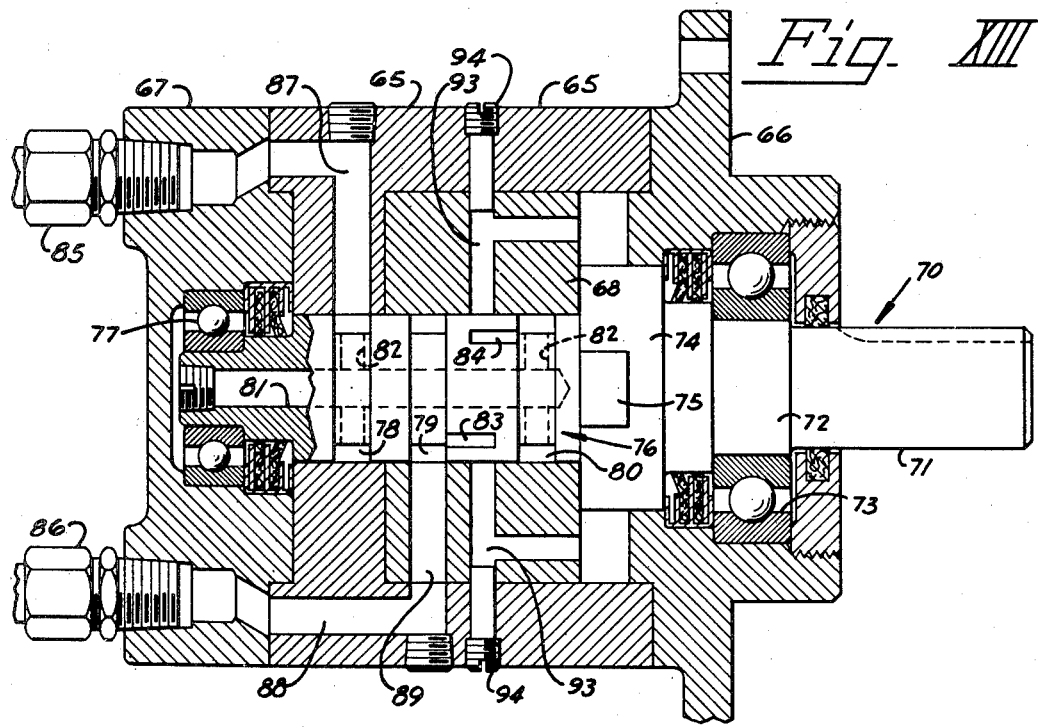
Fig. XIII
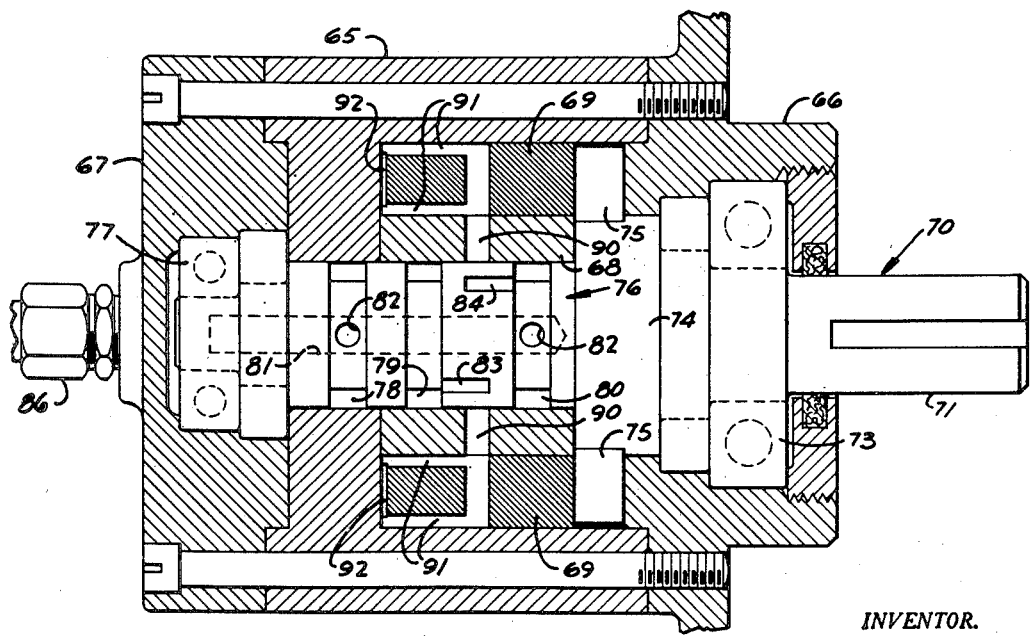
Fig. XIV
INVENTOR.
Roy H. Deitrickson
BY
Marshall & Marshall
ATTORNEYS July 5, 1949.　　　R. H. DEITRICKSON　　　2,475,224
ROTARY HYDRAULIC MOTOR
Filed Oct. 14, 1944　　　　　　　　　　　　　6 Sheets-Sheet 5
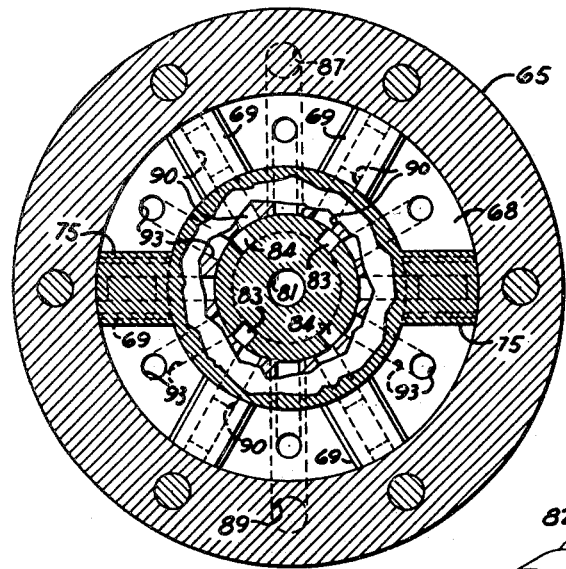
Fig. XVII
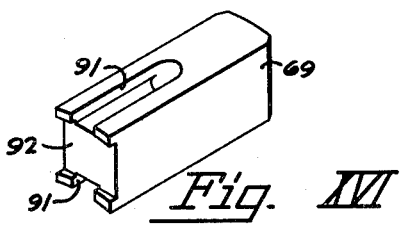
Fig. XVI
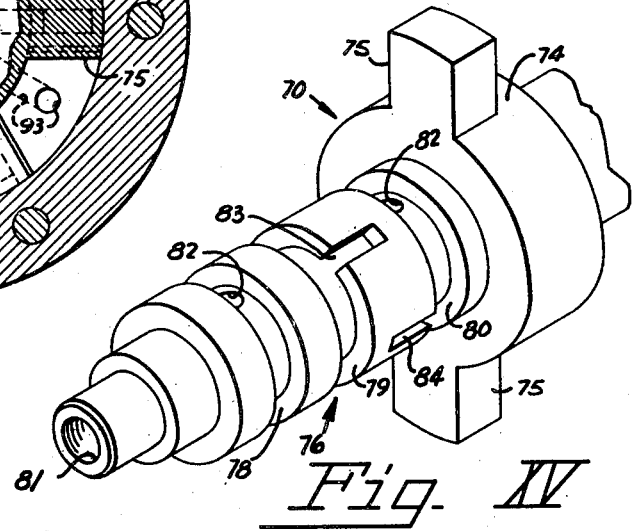
Fig. XV
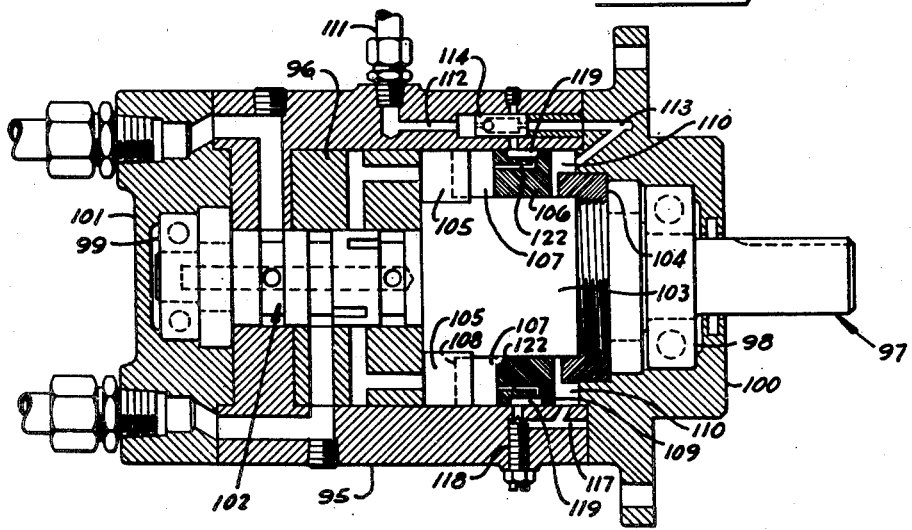
Fig. XVIII
INVENTOR.
Roy H. Deitrickson
BY
Marshall & Marshall
ATTORNEYS

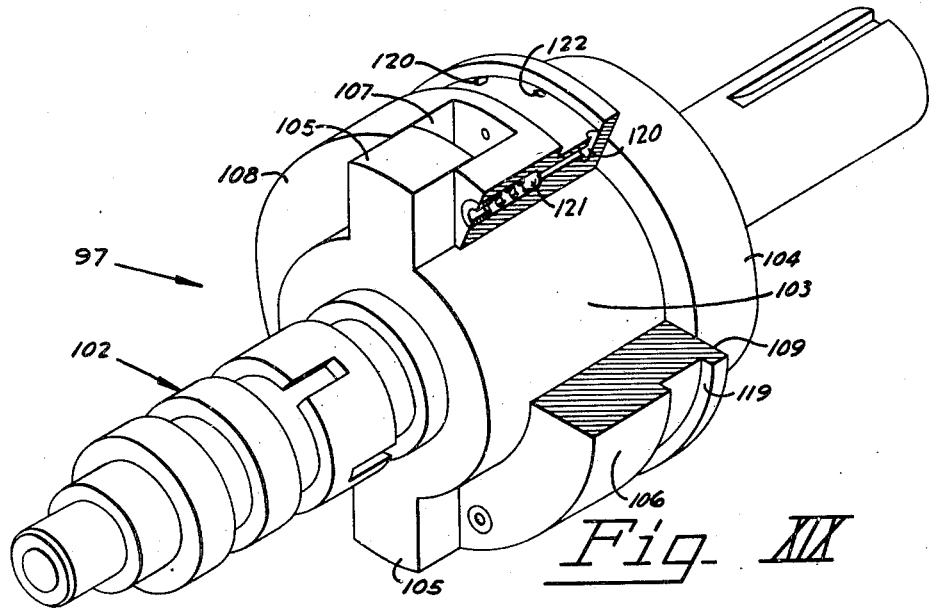
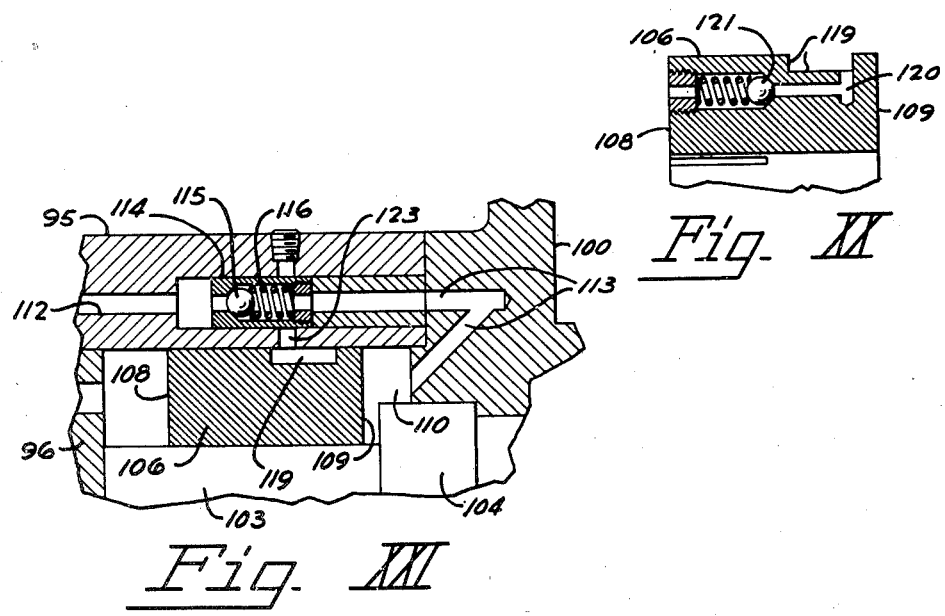

Patented July 5, 1949

2,475,224

UNITED STATES PATENT OFFICE 2,475,224

ROTARY HYDRAULIC MOTOR

Roy H. Deitrickson, Toledo, Ohio, assignor of one-half to J. McLeod Little, Toledo, Ohio Application October 14, 1944, Serial No. 558,647

13 Claims. (Cl. 121—92)

This invention relates to hydraulic devices and in particular to rotary hydraulic motors for converting the flow of a hydraulic fluid into a corresponding mechanical motion. In the hydraulic transmission of power a pump is used to maintain a pressure to produce a flow of liquid in a conduit. At the point of utilization the hydraulic power is converted into mechanical power through a hydraulic motor. These motors are of various types, but in general are subject to the defect that the hydraulic pressure used to secure rotation of the shaft imposes a relatively high side pressure against the shaft. The side pressure increases the friction in the motor and thus lowers its efficiency.

The object of this invention is to provide a hydraulic motor in which the hydraulic pressures are balanced so that a substantially pure torque is applied to the rotating member.

Another object of the invention is to provide a hydraulic motor having a minimum of rubbing surfaces.

Another object of the invention is to provide a reversible hydraulic motor having its hydraulic pressures balanced so that a pure torque is applied to the rotating member.

Another object is to provide a hydraulic motor whose displacement may be varied while the motor is in operation.

These and other objects and advantages are apparent from the following description taken in connection with the accompanying drawings.

In the drawings:

Figure I is a vertical longitudinal section through a simple hydraulic motor embodying features of the invention.

Figure II is an elevation of the interior side of the end plate of the hydraulic motor shown in Figure I.

Figure III is a perspective view of the moving parts of the motor shown in Figure I.

Figure IV is a cross section taken in a plane perpendicular to the shaft along the line IV—IV of Figure I.

Figure V is a fragmentary cross section taken along the line V—V of Figure IV.

Figure VI is a fragmentary elevation looking into the housing of the motor shown in Figure I after the rotating parts have been removed.

Figure VII is a front elevation, with parts broken away, and the rotor removed, of another form of hydraulic motor embodying the invention.

Figure VIII is a vertical section through the motor taken substantially along the line VIII—VIII of Figure VII.

Figure IX is a horizontal section taken substantially along the line IX—IX of Figure VII.

Figure X is a perspective view of the rotor of the hydraulic motor shown in Figures VII, VIII and IX.

Figure XI is an end view, partly in section and with parts broken away, showing the relation of the valving with respect to the reciprocating elements and the rotor.

Figure XII is a developed view taken substantially along the line XII—XII of Figure XI.

Figure XIII is a horizontal section of a third form of hydraulic motor.

Figure XIV is a vertical section through the third form of hydraulic motor.

Figure XV is a perspective view of the rotor of the third form of hydraulic motor.

Figure XVI is a perspective view of a reciprocating element for the third form of hydraulic motor.

Figure XVII is a cross section with parts broken away to show the valve timing of the third form of hydraulic motor.

Figure XVIII is a horizontal section through a variable displacement type of hydraulic motor.

Figure XIX is a perspective view of the rotor of the variable displacement hydraulic motor.

Figure XX is a fragmentary detail of a check valve used in the rotor shown in Figure XIX.

Figure XXI is an enlarged fragmentary detail of the check valve used in the displacement control circuit.

These specific drawings and the accompanying description are intended merely to illustrate the invention and not to impose limitations on the claims.

The invention comprises arranging the parts of a hydraulic motor so that the hydraulic pressure is balanced radially and substantially balanced axially, and applies substantially a pure torque to the rotor. The improved hydraulic motor is thus able to provide high torque, particularly at low speeds, with very little increase in friction. This advantage is secured by providing a structure having an annular chamber of generally rectangular cross section in which three sides of the cross section are provided by one member of the motor and the fourth side is provided by the other member. A series of reciprocating elements are carried in that member providing the three sides and are so arranged that when extended they divide the annular chamber into a plurality of smaller chambers. The other member has a fixed projection also adapted to separate the annular chamber into separate parts. The hydraulic system is so arranged that in flowing through the hydraulic motor the liquid first causes one of the elements to be extended into the annular chamber and thus form a pressure chamber between it and the projection extending from the other member. The hydraulic fluid flowing into this chamber causes the two motor members to rotate relative to each other. As the projection and the next one of the elements pass each other, liquid is admitted behind the element, forcing it into the annular chamber and thus causing further rotation of the motor. As soon as the second element is fully extended into the chamber, the pressure is relieved behind the first element so that the hydraulic pressure produced between it and the approaching side of the projection will cause the element to be driven clear of the annular chamber to allow passage of the projection. Because three sides of the chamber are provided by one member, hydraulic pressure in one of the three possible directions is completely canceled. By proper design, as shown in the examples, the hydraulic pressure in the second direction may also be balanced without increasing the friction loading, thus leaving only the circumferential force (that force producing torque) as the major force acting between the rotating and stationary parts of the hydraulic motor.

In the above general discussion and in the following description of specific embodiments of the inventive concept, the motors disclosed are all considered as being composed of two relatively rotatable members. These two members are, of course, properly called a "rotor" and a "stator" but in these descriptions their movement with relation to fixed objects in space is less important than their relative movement. Because the relative movement of the two motor members is the important objective, certain parts of the motors are called by the same generic functional names regardless of whether they appear in the "rotor" or in the "stator." Thus, the words "reciprocating element" are used to describe those parts which move with respect to the member in which they are mounted, i.e., the elements are those parts which are moved into and out of the annular chamber defined by the "rotor" and "stator" no matter where they are located in the "rotor" or in the "stator." It is the reciprocal movement of the elements which displaces the liquid and produces the relative rotation of the motor elements. Conversely, the word "projection" is used to describe those parts which are fixed with respect to the member on which they are mounted, i. e., the projections are those parts which always extend or project into the annular chamber defined by the "rotor" and "stator" no matter whether they are located in the "rotor" or in the "stator." The projections are those parts extending into the annular chamber against which hydraulic pressure is exerted by the reciprocal movement of the elements.

In the first example chosen to illustrate the invention, the hydraulic motor comprises a shallow, cup-like housing 1 closed by a cover 2. A shaft 3 extends into the cup-shaped housing and is journaled in bearings 4 and 5 located in the housing 1 and cover 2 respectively. A rotor 6 carried on the shaft 3 comprises a cylindrical center portion 7 surrounded by a cup-like shell 8. The shell 8 is closely fitted within the cup-shaped housing 1. A series of radially movable reciprocating elements 9 are fitted in wide radial slots 10 cut in the cylindrical center portion 7 of the rotor. The width of the reciprocating elements 9, the thickness of the cylindrical center portion 7 and the depth of the interior of the cup-shaped shell 8 are all equal. Also, the slots 10 are of sufficient depth so that the elements 9, when retracted, are contained entirely within the periphery of the cylindrical center portion 7. The diameter of the cylindrical portion 7 is made less than the inside diameter of the cup-shaped shell 8 thereby forming an annular rectangular cross-section space 11 therebetween. The radial extent of this space 11 is small enough to be radially spanned by the elements 9 while they are still firmly guided within the wide slots 10. The cover 2 is provided with a C-shaped rectangular cross-section projection 12 adapted to closely fit within the annular chamber 11. When these parts are assembled, as shown in Figure IV, a semiannular chamber is formed which is bounded by the cup-shaped shell 8 on its outer edge, the cylindrical portion 7 on its inner edge, the cover 2 and the bottom of the cup-shaped shell 8 on its sides and the ends of the C-shaped projection 12 on its ends.

Hydraulic fluid enters the hydraulic motor through a pipe 13 connected to a source of liquid pressure and passes through a radial duct 14, a milled arcuate slot 15 and passages 16 to chambers 17 formed within the slots 10 below the elements 9. As the liquid enters a chamber 17 it forces the associated element 9 outwardly into the annular chamber 11. When the element 9 is fully extended and firmly in contact with the interior rim of the cup-shaped shell 8, the liquid is also allowed to flow through a duct 18 in the element 9 into that portion of the annular chamber 11 located between a square end 19 of the C-shaped projection 12 and a face 20 of the element 9.

Of the forces exerted by the hydraulic pressure in this chamber those acting against the rim of the cup-shaped shell 8 and those acting against the periphery of the cylindrical portion 7 exactly cancel each other, those acting against the cover 2 and the bottom of the cup-shaped shell 8 produce an axial component which is balanced by leakage from the sides of the milled slot 15, and those acting between the side 20 of the element 9 and the end 19 of the C-shaped projection 12 produce a torque—the useful output of the device. If the leakage is found to be insufficient a further axial component of force may be provided hydraulically by cutting a second slot 21 in the bottom of the housing and connecting it through a port 22 into the radial duct 14.

As the rotor turns under the influence of the pressure exerted against the side 20 of the element 9, hydraulic liquid is displaced from a portion 23 of the annular chamber 11 located between a leading edge 24 of an element 9 and a beveled end 25 of the C-shaped projection 12. The liquid flows from this chamber through a duct 26 and after passing a check valve 27 passes through a radial duct 28 into an exhaust or discharge pipe 29. The spring-loaded check valve 27 maintains a slight pressure in the chamber 23 so that when the ports 16 register with a milled slot 30 liquid will be displaced from the chamber 17 through the slot 30 and a port 31 into the discharge duct 28. The complete release of pressure from the chamber 17 and the pressure created in the chamber 23 by the approach of the leading edge 24 of an element 9 to the end 25 of the projection 12, causes the element 9 to be completely withdrawn into the slot 10 so that it passes the inner side of the C-shaped projection 12 without rubbing against it.

In actual operation, the ends of the elements 9 never touch the beveled end of the projection 12 but are completley retracted into their sockets 10 by the time they approach within one eighth inch or so of the end of the projection 12. The beveled end is provided primarily as a safety feature in the event of failure of the spring loaded check valve 27, which failure would permit all the fluid between the approaching one of the elements 9 and the end of the projection 12 to escape and thus would prevent the creation of hydraulic pressure in the chamber 23 to retract the element 9.

The retraction of each of the reciprocating elements 9 depends upon the build-up of pressure between the next successive one of the elements 9 and the face of the projection 12. In the motor as shown in Figure IV, the reciprocating element shown in the three o'clock position will start to retract soon after the element now shown in the twelve o'clock position is fully extended and rotated, with the rotor, to approximately the one-thirty position, i. e., when the space 17 back of the element 9 is vented to exhaust. At this time, the pressure within the chamber 23, because of the check valve 27, builds up and, since the outer ends of the elements 9 cannot make a liquid-tight seal with the surface of the shell 8, the film of liquid between the end of that one of the elements 9 approaching the projection 12 and the shell 8 delivers the built-up pressure to the element 9 acting radially on the outer end of the element 9. Because the space 17 back of the element 9 is vented to exhaust, no force, other than centrifugal force, exists to oppose the retraction. The hydraulic pressure is so controlled as to overcome the centrifugal force.

There is no binding of the sides of the element 9 against the slot 10 because the same pressure acts on both the leading edge 24 and the trailing face 26, thus neutralizing any circumferential pressure on the element 9.

The housing 1 and the cover 2 are each provided with a plurality of bosses 32 in aligned relationship (see Figure V) so that the motor may be mounted conveniently upon the structure which it is to drive. It should be noted that in this example the only rubbing contact against the elements 9 is that occurring between the elements 9 and the cover 2. Except for that surface, the elements 9, whether extended or retracted, are contained entirely within a unitary structure in which all the parts move at the same relative velocity. When the elements 9 are extended as they pass the end 19 of the C-shaped projection 12 the forces against them are entirely radial until they are extended against the rim of the shell 8. Lateral force is then exerted but there is no longer any relative motion between the element 9 and the cylindrical portion 7. The lateral pressure is relieved as soon as the succeeding element 9 is fully extended and the port 16 registers with the slot 30. Thus there are no forces tending to cause the elements 9 to bind in the slots 10. The small amount of liquid entrapped between the inner side of the C-shaped projection 12 and the cylindrical portion 7 helps to maintain the elements 9 completely retracted and out of rubbing contact with the C-shaped projection 12.

It will be noticed that in the preceding example the reciprocating elements are mounted in and rotate with the rotary part of the motor moving radially into and out of the annular chamber. In the next example the reciprocating elements are located in the stator where they are mounted to slide axially into and out of the annular chamber and the rotor is provided with a pair of radially extending projections extending into the annular chamber. In this example the motor comprises a cylindrical housing 33 having rigidly mounted therein a cylindrical member 34. (See Figure VII which shows the motor with the rotor and end cap removed.) The cylindrical member 34 is secured to the end wall of the housing by means of four screws 35. The cylindrical member 34 is provided with a plurality, in this case six, slots 36 in its periphery. A generally rectangular reciprocating element 37 is fitted into each of the slots 36 so that it can slide axially therein. The housing 33 is of greater axial depth than the axial length of the cylindrical member 34 and thus when an end cap 38 is secured to the end of the housing 33 a disk-shaped chamber is left vacant.

The cylindrical member 34 is provided with an axial cylindrical bore 39 which aligns with bearings 40 and 41, in this case ball bearings, mounted in the cap 38 and the housing 33 respectively. The rotor of this motor, shown in perspective in Figure X, comprises a cylindrical portion 42 whose radius is equal to a radius of the member 34 measured from its axis to the bottom of the slots 36, a pair of projections 43 extending radially from the cylindrical portion 42 and having an outside radius equal to the inside radius of the cylindrical housing 33. The projections 43 are each formed with a curved leading surface 44 and a square trailing surface 45. The axial length of the cylindrical portion 42 and the thickness of the projections 43 is equal to the thickness of the disk-shaped space left between the cover 38 and the member 34 in the housing 33. Thus an annular rectangular cross-section operating space is provided which is bounded on the outside by the cylindrical housing 33, on one side by the cap 38, on the other side by the end of the cylindrical member 34 and the ends of the elements 37, and on its inner edge by the periphery of the cylindrical portion 42 of the rotor. The projections 43 of the rotor extend into and obstruct circumferential flow through this annular chamber.

A rotary valve 46 formed integrally with the rotor, adjacent the cylindrical portion 42, is adapted to fit within the cylindrical bore in the nonrotating cylindrical member 34. The valve portion 46 is provided with two circumferential grooves 47 and 48 and relieved areas 49 and 50 communicating with the grooves. When the rotor is installed in the housing with the valve portion 46 fitted into the cylindrical member 34 the circumferential groove 48 registers with the end of a passage 51 drilled through the cylindrical member 34 and terminating in a connection 52 leading to a source of hydraulic liquid. The other circumferential groove 47 registers with the end of a second passage 53 which leads to a discharge line 54. A plurality of passages 55, one for each of the slots 36, are drilled through the cylindrical block 34 from the bottom of the slots 36 to the bore through the cylindrical member 34 and registers with the relieved areas 49 and 50.

Hydraulic fluid enters under pressure through the connection 52, passes upwardly through the passage 51, as seen in Figure VIII, and enters the annular groove 48 and the relieved spaces 50. Referring to Figure XI, the liquid under pressure in the relieved area 50 passes up through the passage 55 in communication therewith and into a relieved space 56 behind the associated reciprocating element 37. The element 37 moves axially into the annular chamber in response to the hydraulic pressure. As soon as the element is completely extended the hydraulic fluid is allowed to flow through a passage 57 in the element 37 into a pressure chamber 58 formed between the side of the element 37 and the square edge 45 of the projection 43 on the rotor. The pressure against the square edge 45 of the projection causes the rotor to turn in a counterclockwise direction as seen in Figure XI.

As the rotor turns, hydraulic fluid is displaced from the chamber formed immediately ahead of the curved face 44 of the projection, the liquid flowing through an orifice 59 into a passage 60 extending diametrically through the rotor and connected into an axial passage 61. A spring-loaded valve 62 meters the liquid flow from the passage 61 into another passage 63 which is in communication with the groove 47 leading to the discharge. Thus a small positive pressure is maintained in the space immediately ahead of the curved face 44 of the projection. As the curved face 44 approaches one of the reciprocating elements 37 the relieved area 49 of the rotary valve portion 46 registers with the associated passage 55 thereby relieving the hydraulic pressure behind the element and allowing the small positive pressure created by the spring-loaded valve 62 to retract the element out of the way of the projection 43 in a manner similar to that described with reference to the embodiment shown in Figures I through VI.

The sequence of events, as the rotor turns, is illustrated in Figure XII. This figure, a developed view of slightly more than a half circumference, shows one of the elements 37 fully extended so that the annular chamber between the square face 45 of one of the projections 43 and the curved face 44 of the next projection is divided into two chambers, the pressure chamber 58 and a discharge chamber 64. One of the other elements 37 is shown partially extended into the chamber 58 thus driving the rotor forward. This element has its associated passage 55 connected to the inlet duct 51 through the relieved space 50. As soon as the partially extended element 37 is fully extended, the passage 55 associated with the previously extended element 37 registers with the relieved portion 49 and that element is then retracted to clear the annular chamber.

It will be noticed that in this example, as well as in that preceding, the elements 37 are not subjected to any side or lateral force until they are fully extended and that likewise they are relieved of lateral force simultaneously with the start of their retraction. Hydraulic pressure acts circumferentially against the square face 45 of the projection and against the periphery of the cylindrical section 42. The pressures against the faces 45 exert a pure torque on the shaft while those acting against the periphery of the portion 42 are diametrically balanced so that no lateral force is applied to the rotor shaft. The other surfaces defining the annular chamber are stationary within the housing so they cannot introduce friction or retard rotation of the rotor. It will be readily seen that this structure is therefore capable of delivering high torque with no material increase in its internal friction. This example differs from the first in that in this example three of the four surfaces defining the sides of the rectangular cross-section annular chamber are provided by the stationary member while the fourth side is provided by the rotating member, whereas in the first example three sides were provided by the rotating member while a single side was provided by the stationary member. In common with the first example the reciprocating elements in this example are mounted in that member providing three of the four sides of the annular chamber. Except for providing an axial motion for the elements rather than a radial motion of the elements, the second example is practically an inversion of the first.

These two examples of hydraulic motors are limited in that they are nonreversible. The second example may be modified so that its direction of rotation may be reversed. Figures XIII to XVII inclusive illustrate a reversible hydraulic motor having the same general properties as the motor shown in Figures VII to XII inclusive. In altering the motor of the second example to make it reversible, the rotor must be made symmetrical about a plane through its axis and through the center of the projections extending into the annular chamber. Likewise the stationary members must be symmetrical about a diametrical plane through one of the elements. When a motor similar to that of the second example is so modified, it is immaterial as to which is the inlet and which is the outlet passage. When it is connected one way it runs in one direction, when the connections are reversed it runs in the opposite direction.

A third example of a hydraulic motor is similar to the second example except that it includes the modifications which are required to make it reversible. It comprises a substantially cylindrical housing 65 having end plates 66 and 67. The housing 65 by itself is substantially cup-shaped and has a cylindrical member 68 secured in the bottom of the cup-shaped interior. The cylindrical member 68 corresponds to the cylindrical member 34 of the second example. It, likewise, has a plurality of generally rectangular slots cut in its periphery. A series of reciprocating elements 69 are mounted in and adapted to slide axially in these peripheral slots. These elements 69 have a length substantially equal to the axial length of the cylindrical member 68 so that when they are retracted their ends are coplanar with the end surface of the cylindrical member 68. A rotor 70 (Figure XV) comprises a shaft portion 71 extending exteriorly of the end plate 66, a slightly larger diameter portion 72 carried on a ball bearing 73 mounted in the end plate 66 and a larger cylindrical portion 74. A pair of projections 75 extend radially outward from the enlarged cylindrical portion 74. The rotor also includes a rotary valve portion 76 and at its other end is carried on a second ball bearing 77 mounted in the end plate 67. The rotary valve portion 76 comprises three annular grooves 78, 79 and 80, the grooves 78 and 80 being connected together by an axial passage 81 and short radial passages 82. The periphery of the rotary valve 76 between the grooves 79 and 80 has two relieved portions 83 extending axially from the circumferential groove 79 and two relieved portions 84 extending axially from the annular groove 80. The relieved portions 83 and 84 are disposed 90° apart and each extends substantially more than half way across the land between the grooves 79 and 80.

Hydraulic fluid is fed to and removed from the hydraulic motor through connections 85 and 86. The connection 85 leads through a passage in the end plate 67 to a radial passage 87 in the cylindrical housing 65 registering with the circumferential groove 78. Likewise, the connection 86 leads through passages 88 and 89 to the circumferential groove 79. Thus the relieved portions 83 of the rotary valve are in communication with the connection 86 while the relieved portions 84 are in communication with the connection 85, the latter being by way of the passages 81 and 82 in the rotor shaft.

As seen in Figures XIV and XVII, a series of radial passages 90 are provided in the cylindrical member 68. The passages 90 extend from the bottom of the slots of the periphery of the member 68 and register with the central portion of the land between the grooves 79 and 80. These passages, as they register with the relieved portions 83 and 84 of the land, alternately admit and extract hydraulic fluid from the space behind the reciprocating elements 69. Passages 91 in the elements 69 register with the passages 90 and allow the hydraulic fluid to act against the ends of the elements 69. A milled cross slot 92 on the end of each element 69 facilitates the entrance of hydraulic fluid behind the element 69 by preventing adhesion between the end of the element 69 and the bottom of the cup-shaped space in the housing 65. In addition to the passages 90, another series of passages 93 interspersed between the passages 90 lead from the rotary valve 76 to the annular chamber.

Since the driving torque is developed by hydraulic pressure acting between the projections 75 of the rotor and the extended elements 69, it is necessary that the cylindrical member 68 be securely anchored in place. In this example this is accomplished by providing a plurality of set-screws 94 which are threaded into the housing 65 with their cylindrical ends entering the ends of the passages 93. It would, of course, also be possible to anchor the cylindrical member 68 by passing a number of screws through the adjacent end of the housing 65.

The operation of this motor may be understood by tracing the flow of hydraulic fluid from the connection 85 to the connection 86. Assuming that the pressure in the connection 85 is higher than that in the other connection, the liquid flows through the passage 87, the annular groove 78, rotor passages 81 and 82 and the groove 80 to the relieved portions 84. From the relieved portions 84 of the rotary valve 76 liquid flows outwardly through the registering radial passages 93 into those portions of the annular chamber defined between the projection 75 and the extended elements 69. Figure XVII shows the timing of the movements of the element 69. In the position shown, liquid is passing from the relieved portions 84 through two of the passages 90 thus driving the elements 69 associated therewith into the annular chamber thereby moving the rotor in a counterclockwise direction. After the rotor has moved a slight distance from the position shown, the reliefs 84 register with passages 93 to deliver liquid directly to the pressure chambers formed between the extended elements 69 and the projections 75. During the same interval liquid has been flowing from the chambers defined between the other sides of the extended elements 69 and the advancing edges of the projection 75. At the position shown, outward flow through the passages 93 has been interrupted while flow through the adjacent passages 90 has been established, thereby allowing the elements 69 immediately ahead of the projections 75 to be retracted by the hydraulic pressure developed between their edges and the approaching projections 75. Hydraulic liquid flowing into the reliefs 83 from the passages 90 or 93 flows through the annular groove 79, passages 89 and 88 to the other connection 86. The cycle of operations for a particular element 69, which is repeated twice a revolution because there are two projections 75 on the rotor, begins with an entrance into the annular chamber which is started just as a projection 75 passes. This entrance tends to increase the pressure in the chamber formed between a previously extended element 69 and a projection 75 thus forcing the projection and, hence, the rotor forward. Shortly after the element has been fully extended into the pressure chamber, the flow of hydraulic fluid to the space behind it is cut off and flow is established through another passage into a new pressure chamber formed between the recently extended element 69 and the retreating edge of the projection 75. As the projection 75 passes the next of the elements 69 and the next element is extended into the chamber, the space behind the first element is opened to exhaust and the hydraulic pressure built up between the element and the approaching projection retracts the element 69 from the annular chamber. The operation of the motor therefore depends upon successively forming a series of pressure chambers behind the projections 75 thus providing the driving torque and simultaneously exhausting a similar set of chambers immediately ahead of each of the projections 75.

This structure is symmetrical with respect to the reciprocating elements 69 and the rotor 70. Therefore, by merely reversing the flow of hydraulic fluid, by making the connection 86 the high pressure connection rather than the connection 85, the direction of rotation of the motor is reversed. In this case, hydraulic fluid flows from the reliefs 83 into the passages 90 and 93 and when later in the cycle from the passages 90 and 93 into the reliefs 84 and thence through to the connection 85.

This example retains the advantages outlined in regard to the first and second examples in that the annular working chamber is defined on three of its sides by one of the members and on the fourth side by the other member, in this case, the rotating member. Further, the hydraulic pressure applied to the rotor, particularly to the cylindrical surface 74, acts radially and is completely balanced because of the symmetry of the structure. Likewise, by pressure applied to the sides of the projection 75 there is produced on each a lateral force but these forces being on opposite sides of the shaft and equally spaced therefrom are combined to produce a pure torque. This structure thus achieves, in addition to reversibility, the capacity to produce high torque with low internal friction.

It is sometimes desirable or necessary to change the speed of a hydraulic motor without altering the flow of liquid through it. For example, it may be desired to synchronize the operation of two devices each of which is driven by a hydraulic motor. If the motors have exactly the same displacement per revolution they will, when connected in series, run at substantially the same speed because the same quantity of liquid passes through each. However, it is difficult in practice to secure exactly the same displacement because of the effects of leakage and load. It is possible to modify the structure of the preceding example to secure a variable displacement type hydraulic motor in which the displacement is hydraulically controlled. The structure is such that mechanical control of the displacement may be easily substituted for the hydraulic control.

An example of a variable displacement reversible hydraulic motor is shown in Figures XVIII to XXI inclusive. This structure comprises a generally cylindrical housing 95. The housing 95 is similar to the housing 65 except that it is of greater axial length and has auxiliary passages running through it. Within the housing 95 a generally cylindrical member 96 is positioned. The member 96 corresponds in function and design to the slotted cylindrical member 68. It is fitted with reciprocating elements and a plurality of hydraulic passages in the same fashion as the cylindrical member 68. A rotor 97 is journaled in bearings 98 and 99 mounted in end plates 100 and 101 respectively. The rotor 97 includes a cylindrical rotary valve portion 102 similar in design and function to the rotary valve portion 76 of the rotor 70. The hydraulic operation of this part of this motor is exactly similar to that of the preceding example. The rotor 97 differs from the rotor 70 in that a cylindrical surface 103, similar to the surface 74, is of substantially greater axial length. Also an internally threaded ring 104 is threaded onto the rotor immediately adjacent the cylindrical surface 103. This rotor is provided with a pair of projections 105 similar in function to the projections 75 of the previous example. A wide collar 106 is slidably mounted on the cylindrical surface 103 and has a pair of notches 107 cut into one of its faces 108 to accommodate the projections 105. The face 108 provides one side of the annular operating chamber and in that respect replaces the end plate 66 of the preceding example. By sliding the collar 106 axially on the surface 103 the volume of the annular chamber and hence the displacement may be varied between rather wide limits. The collar 106 is held in axial position by hydraulic pressure exerted against its rear face 109 by hydraulic fluid contained in an annular chamber 110. Hydraulic fluid is supplied to the chamber 110 through a connection 111, a passage 112 drilled in the casing 95 and passages 113 drilled in the end plate 100. The passage 112 includes a floating check valve comprising a slidable body 114 in which is contained a ball check valve 115 and a spring 116. When hydraulic fluid is entering through the connection 111 the resistance to flow by the spring-held ball 115 causes the slidable body 114 to slide to the position shown in Figure XVIII. The hydraulic fluid flows through the check valve, the passages 113 to the annular chamber 110.

Hydraulic fluid is continually drawn from the chamber 110 through a passage 117 past an adjustable restriction afforded by a setscrew 118. After passing the setscrew 118 the hydraulic fluid flows into an annular groove 119 cut in the periphery of the collar 106. From the annular groove 119 in the collar 106 the liquid flows inwardly through passages 120 (Figure XIX) and past ball check valves 121 and into the annular chamber on one or the other side of the projections 105. The check valves 121 are required because, depending upon the direction of rotation, a pressure chamber exists on one side of each of the projections 105 and a discharge chamber exists on the other side of each and it is necessary that the liquid should flow into the discharge chambers and not from the pressure chambers back into the groove 119. The check valves 121 prevent such back flow. Other passages 122 connect the pockets behind the projections 105 in the notches 107 with the annular groove 119 so that there will be no hydraulic fluid trapped in the notches which would prevent axial motion of the collar 106.

The control of this displacement varying collar 106 is accomplished by regulating the pressure of the hydraulic fluid admitted through the connection 111 and the restriction afforded by the setscrew 118. There will always be a certain amount of flow through this chamber which is controlled primarily by the setscrew 118. In case it is desired to suddenly decrease the displacement, which is accomplished by increasing the pressure applied to the connection 111, the increase in inward flow resulting from the increase in pressure causes an accumulation of liquid in the annular chamber 110 thus forcing the collar 106 axially toward the reciprocating elements operating in the annular chamber. No difficulty is experienced in moving the collar 106 in this direction. However, when it is desired to provide a rapid increase in displacement, in other words, to slide the collar 106 away from the reciprocating elements, difficulty is experienced because of the restriction offered by the setscrew 118. To provide for this when the pressure in the connection 111 is reduced, back flow through the passages 113 is allowed. This back flow slides the check valve assembly 114 to the other end of its travel thus uncovering a port 123 which leads directly into the annular chamber 119 and is, in effect, a bypass around the setscrew 118.

The pressure required to operate the collar 106 and to maintain it in a selected position is intermediate between inlet and discharge pressures applied to the motor. This follows because portions of the face 108 of the collar 106 are exposed to inlet pressures while other portions are exposed to discharge pressures.

In this example the speed of the hydraulic motor may be varied between wide limits for a constant rate of flow of hydraulic fluid or the speed may be held constant and the rate of flow of hydraulic fluid adjusted to meet the torque requirements.

Each of these examples of hydraulic motors is characterized by the fact that the internal friction of the motor is substantially independent of the power being transmitted through it. This occurs because the hydraulic pressures are balanced so as to exert a pure torque on the rotor.

Having described the invention, I claim:

1. In a rotary hydraulic motor of the class described, in combination, a stationary member, a rotary member, said members cooperating to form an annular chamber having a generally rectangular cross section in which one of said members provides one side and the other of said members provides three sides, a projection on that member providing one side, said projection serving to obstruct said annular chamber thus forming one end of a pressure chamber, a series of reciprocating elements in the other of said members, said elements being liquid actuated and slidable between two positions in one of which they are clear of said annular chamber and in the other of which they obstruct said annular chamber thus forming the other end of the pressure chamber, valve and port means controlled by rotation of said rotary member for admitting liquid behind certain of said elements to force them into obstructing position, said valve and port means also acting to relieve the pressure behind others of said elements upon approach to said projection to effect their withdrawal from said annular chamber by the action of pressure between said elements and said approaching projection to allow said projection to pass said elements.

2. In a rotary hydraulic motor of the class described, in combination, a stationary housing having an axial cylindrical recess, an annular member non-rotatably mounted in the bottom of said recess, said annular member having a plurality of generally rectangular slots in its periphery, a rotor journaled in said housing, said rotor having radial projections of rectangular cross section extending to the inner periphery of said recess adjacent said annular member, a plurality of reciprocating elements slidably mounted in slots, a rotary valve mounted on said rotor within a bore through said annular member, and a series of ports registering with said rotary valve for admitting hydraulic fluid to and withdrawing hydraulic fluid from the slots behind said elements and an annular chamber formed by said housing and said rotor to effect projection of the elements into and to permit retraction of the elements from the annular chamber upon relative approach of the elements and the projection by the hydraulic pressure between the approaching elements and projections.

3. In a hydraulically actuated motor, in combination, a first member, a second member, the first and second members being rotatable with respect to each other and cooperating to form an annular chamber of which the first member forms three sides, a projection on the second member for interrupting the annular chamber, a plurality of reciprocating elements contained in spaces in the first member and movable between extended positions interrupting the chamber and retracted positions clear of the chamber, hydraulic passages in the members and in the elements, the passages leading from a liquid inlet to the space behind the elements and, when an element is extended, through the extended element into a portion of the chamber between the extended element and the projection and means for allowing a restricted flow of liquid from the portion of said chamber between an approaching extended element and said projection to create pressure in such portion of said chamber for returning the approaching extended element to its retracted position prior to contact with said projection.

4. In a hydraulically actuated motor, in combination, a first member, a second member, the first and second members being relatively rotatable and cooperating to form an annular chamber of which the first member forms three sides, a projection on the second member for interrupting the annular chamber, a plurality of reciprocating elements contained in spaces in the first member and movable between a retracted position clear of the chamber and an extended position interrupting the chamber, hydraulic passages formed in the members and valved by relative rotation of the members, the passages leading from an inlet to the space beneath a retracted element and when the element is fully extended to a portion of the annular chamber lying between the element and the receding side of said projection, and means for allowing a restricted flow of liquid from a discharge portion of the annular chamber between an element and an approaching side of said projection whereby the pressure created in the liquid in such discharge portion of said annular chamber displaces said element from said annular chamber, returning said element to its retracted position thereby avoiding interference with said projection.

5. In a hydraulically actuated motor, in combination, a first member, a second member, the first and second members being relatively rotatable and cooperating to form an annular chamber of which three sides are formed in the first member, a projection on the second member for interrupting the chamber, a plurality of reciprocating elements contained in spaces in the first member and movable between a retracted position clear of the chamber and an extended position interrupting the chamber, hydraulic passages in the members and in the elements, flow through the passages being valved by the relative positions of the members and directed to the spaces behind the elements to first drive an element as a plunger into a pressure chamber formed by the projection and a previously extended element and, after the element is extended, through the element and into the pressure chamber formed by said element and the receding side of said projection and other passages for permitting flow from the space behind said element after full extension of a subsequent element and for permitting restricted flow from the portion of said annular chamber between the element and the approaching side of said projection, whereby pressure created by such restricted flow displaces said element from said annular chamber moving it to retracted position thereby avoiding interference with said projection.

6. In a hydraulically actuated motor, in combination, a first member, a second member, the first and second members being rotatable with respect to each other and cooperating to form an annular chamber, a projection from one of the members for interrupting circumferential flow through the chamber, a plurality of reciprocating elements contained in slots in the other member and slidable between extended positions interrupting the chamber and retracted positions clear of the chamber, said motor having a liquid inlet and a liquid outlet, said members having passages leading from the liquid inlet to the space in the slots behind the elements and from the slots to the liquid outlet, flow through the passages being regulated by the relative positions of the members, the flow of liquid from the inlet to the space behind an element serving to force the element into the portion of the annular chamber between the projection and a previously extended element and thereby to produce relative rotation of said members, the relative rotation of the members serving to compress liquid in another portion of the annular chamber between an element and the projection to hydraulically eject such extended element therefrom as the space behind the element is connected to the outlet.

7. In a hydraulically actuated motor, in combination, a first member, a second member, the first and second members being rotatable with respect to each other and cooperating to form an annular chamber, a projection on one member for interrupting circumferential flow through the chamber, a plurality of reciprocating elements contained in slots in the other member and slidable between extended positions interrupting the chamber and retracted positions clear of the chamber, said motor having a liquid inlet and a liquid outlet, said members having passages leading from the liquid inlet to the space in the slots behind the elements and from the slots to the liquid outlet, flow through the passages being regulated by the relative positions of the members, the flow of liquid from the inlet to the space behind an element serving to force the element into the portion of the annular chamber between the projection and a previously extended element and thereby to produce relative rotation of said members, the relative rotation of the members serving to compress liquid in another portion of the annular chamber between a relatively approaching extended element and projection to hydraulically eject such extended element therefrom as the space behind the element is connected to the outlet, and auxiliary passages connecting a portion of the annular chamber between a relatively receding element and projection to the inlet and connecting a portion of the annular chamber between a relatively approaching element and projection to the outlet.

8. In a liquid actuated rotary device, in combination, two relatively rotatable concentric members, said members cooperating to form an annular chamber, a projection mounted on one of said members, said projection serving to obstruct said annular chamber and thus to form one end of a segmental pressure chamber therein, a series of reciprocating elements mounted in spaces in the other of said members, said elements being liquid actuated and slidable between two positions in one of which they are clear of said annular chamber and in the other of which they obstruct said annular chamber each thus successively forming the other end of the pressure chamber therein, and valve and port means controlled by relative rotation of said members for admitting liquid in the space behind each reciprocating element as it passes said projection to force it into obstructing position, said means also acting to relieve the pressure behind each element as a successive element is forced into said chamber and the first element approaches said projection whereby the volume change in that portion of said annular chamber between the approaching faces of said first element and said projection acts to retract said first element into its space in the other of said members thereby to avoid interference between the approaching projection and said element.

9. In a hydraulic motor, in combination, two relatively rotatable, substantially concentric members, said members cooperating to define an annular chamber, at least one projection on the first of said members extending into and obstructing circumferential flow of liquid through said annular chamber, a series of reciprocating elements movably mounted in spaces in the second of said members, said projection and said elements thereby being movable relative to each other, and valves and ports formed in said members to admit liquid into the spaces in the second of said members behind said elements for extending said elements successively into said annular chamber where not obstructed by said projection on the first said member, each element forming a separate working chamber with said projection, and to admit liquid into said working chamber for moving said elements relative to said projection, said valves and ports also acting to cause the liquid in the spaces behind said elements to be discharged upon approach of said elements to said projection whereby the pressure of the liquid in said annular chamber between approaching faces of said projection and each of said elements returns said elements into the spaces in the second of said members.

10. In a hydraulic motor, in combination, two relatively rotatable, substantially concentric members, said members cooperating to define an annular chamber, at least one projection on the first of said members extending into and obstructing circumferential flow of liquid through said annular chamber, a series of reciprocating elements movably mounted in spaces in the second of said members, valves and ports formed in said members for admitting liquid into the spaces in the second of said members behind said elements to extend said elements successively into said annular chamber where not obstructed by said projection on the first said member, each element forming a separate working chamber with said projections, and for admitting liquid into the working chambers to move said elements relative to said projection, said elements successively passing said projection and each being forced into a working chamber defined by said projection and the preceding one of said elements and, upon being extended, establishing a new working chamber defined by said projection and the newly extended element, said valves and ports also acting to cause the liquid in the space behind each of said elements to be discharged upon approach of said element to said projection whereby the pressure of the liquid in the corresponding working chamber returns said element into the space in the second of said members.

11. In a hydraulic motor, in combination, two relatively rotatable, substantially concentric members, said members cooperating to define an annular chamber, at least one projection on one of said members extending into and obstructing circumferential flow of liquid through said annular chamber, a series of reciprocating elements movably mounted in spaces in the other of said members, said projection and said elements being rotatable relative to each other, valves and ports formed in said members to admit liquid into the spaces in the other of said members behind said elements for extending said elements successively into said annular chamber where not obstructed by said projection on the first said member, each element forming a separate working chamber with said projection, and to admit liquid into the working chambers for moving said elements and projection relative to each other, said elements successively passing said projection and each being forced into said annular chamber in the space defined by said projection and the preceding one of said elements, whereby the liquid displaced by entry of each element acts on the preceding element to produce additional relative rotative movement of said members and, upon complete extension, establishes a new working chamber in said annular chamber defined by said projection and the newly entered element.

12. In a hydraulic motor, in combination, two relatively rotatable concentric members, said members cooperating to form an annular chamber, at least one projection extending from the first member to obstruct liquid flow through the annular chamber, a plurality of reciprocating members contained in spaces in the second member and extendable into and across said chamber, said projection and said plurality of elements forming a succession of working chambers each of which is formed by the extension of an element to divide a then existing working chamber bounded by the projection and a previously extended element, and valves and ports formed in and controlled by rotation of said members for admitting liquid into the spaces back of each of said elements thereby extending each of said elements immediately after relative passage of said projection, said valves and ports also acting to admit liquid into each of said working chambers as it is formed and during and until the formation of a successive working chamber to produce continuous relative rotation of said members and to permit the escape of liquid from such spaces back of each of said elements immediately after a subsequent element has been extended across said chamber, whereby the liquid pressure in each of such prior working chambers causes its corresponding element to retract into its space in the second member immediately before relative passage of said projection and said element.

13. In a hydraulic motor, in combination, two relatively rotatable, substantially concentric members, said members cooperating to define an annular chamber, at least one projection on one of said members extending into and obstructing said annular chamber, a plurality of axially movable reciprocating elements mounted in spaces in the other one of said members and slidable between extended positions interrupting the chamber and retracted positions clear of the chamber, said motor having a liquid inlet and a liquid outlet, said members having passageways and valve means controlled by relative rotation of said members for connecting the liquid inlet successively to the spaces behind said elements as said members rotate relative to each other to extend each of said elements into a space in said chamber between said projection and a previously extended element, the passages and valve means also acting to connect the inlet to the space between said projection and each element when said element is fully extended, the space behind a preceding element being connected to the outlet immediately following complete extension of a subsequent element and being maintained in connection therewith during approach of the preceding element to said projection, whereby the pressure created between the relatively approaching element and projection forces said element into its retracted position clear of said chamber thereby to avoid contact between said element and said projection.

ROY H. DEITRICKSON.

REFERENCES CITED

The following references are of record in the file of this patent:

UNITED STATES PATENTS

| Number | Name | Date |
|---|---|---|
| 141,710 | Gibson | Aug. 12, 1873 |
| 397,516 | Powers | Feb. 12, 1889 |
| 586,694 | Reriz | July 20, 1897 |
| 625,689 | Kingsland | May 23, 1899 |
| 716,642 | Mackle | Dec. 23, 1902 |
| 1,017,355 | White | Feb. 13, 1912 |
| 1,244,529 | Mehle | Oct. 30, 1917 |
| 1,293,459 | Johnson | Feb. 4, 1919 |
| 1,671,399 | Brady | May 29, 1928 |
| 2,067,728 | Plato | Jan. 12, 1937 |
| 2,189,088 | Thompson | Feb. 6, 1940 |
| 2,226,481 | Rose | Dec. 24, 1940 |
| 2,255,781 | Kendrick | Sept. 16, 1941 |
| 2,309,148 | Wilson et al. | Jan. 26, 1943 |

FOREIGN PATENTS

| Number | Country | Date |
|---|---|---|
| 130,199 | Great Britain | July 31, 1919 |
| 566,503 | Germany | Jan. 20, 1933 |